(12) United States Patent
Handschy et al.

(10) Patent No.: US 8,337,020 B2
(45) Date of Patent: Dec. 25, 2012

(54) POLARIZATION CONVERSION AND COLOR-COMBINATION TECHNIQUES FOR PICO PROJECTOR ILLUMINATORS

(75) Inventors: Mark A. Handschy, Boulder, CO (US); Christopher Joseph Berliner, Westminster, CO (US)

(73) Assignee: Citizen Finetech Miyota Co., Ltd., Nagano (JP)

( * ) Notice: Subject to any disclaimer, the term of this patent is extended or adjusted under 35 U.S.C. 154(b) by 566 days.

(21) Appl. No.: 12/611,021

(22) Filed: Nov. 2, 2009

(65) Prior Publication Data
US 2010/0110386 A1    May 6, 2010

Related U.S. Application Data

(60) Provisional application No. 61/110,590, filed on Nov. 2, 2008.

(51) Int. Cl.
*G03B 21/14*   (2006.01)
(52) U.S. Cl. ................................. 353/20; 353/37
(58) Field of Classification Search .......... 353/20, 353/30–33; 362/19; 359/622
See application file for complete search history.

(56) References Cited

OTHER PUBLICATIONS

R. Winston and R. J. Koshel, "Homogeneous LED-Illumination Using Microlens Arrays," Nonimaging Optics and Efficient Illumination Systems II, pp. 59420K1-9, vol. 5942 SPIE, Bellingham, Washington, 2005.
F. E. Doany, R. N. Singh, A. E. Rosenbluth, G. L-T Chiu, "Projection Display Throughput: Efficiency of Optical Transmission and Light-Source Collection," IBM Journal of Research and Development, 2005, pp. 387-399, vol. 42.
Yuhaua Huang, Ying Zhou and Shin-Tson Wu, "Broadband Circular Polarizer Using Stacked Chiral Polymer Films" Optics Express, pp. 6414-6419, vol. 15, 2007.
Mark A. Handschy, "Moves Toward Mobile Projectors Raise Issue of Panel Choice," Display Devices Fall '07, Dempa Publications, Inc., 2007, pp. 6-8.

*Primary Examiner* — Tony Ko

(57) ABSTRACT

Disclosed are illumination systems especially suitable for very small data projectors, called pico projectors. The disclosed illumination systems provide high optical efficiency for projectors that need polarized light but utilize unpolarized light sources such as light-emitting diodes. Some of the disclosed illumination systems make use of light sources of different colors, and provide polarization conversion in ways based on color-selective elements of a variety of different types to convert substantially all the light emitted by the light sources to a single polarization, without increasing the effective optical extent of the source. Other disclosed illumination system provide compact ways to combine light from differently colored light sources without the use of bulky x-cube or angled dichroic elements.

14 Claims, 6 Drawing Sheets

US 8,337,020 B2

POLARIZATION CONVERSION AND COLOR-COMBINATION TECHNIQUES FOR PICO PROJECTOR ILLUMINATORS

CROSS-REFERENCE TO RELATED APPLICATION

This application claims priority under 35 U.S.C. 119 to U.S. Provisional Application No. 61/110,590, entitled: "POLARIZATION CONVERSION AND COLOR-COMBINATION TECHNIQUES FOR PICO PROJECTOR ILLUMINATORS," filed on Nov. 2, 2008, the contents of which are incorporated herein as if set forth in full.

BACKGROUND

The combination of solid-state light sources, like light-emitting diodes (LEDs) and lasers, with microdisplays like liquid-crystal-on-silicon (LCOS) devices is leading to the development of electronic projectors small enough to be embedded in, for example, the handset of a mobile phone. In such "pico projectors," small optical engine size and high optical efficiency are especially important. Achieving size and efficiency goals requires new ways of combining the light from light sources of different color and creating a polarized beam of light suitable for illuminating a microdisplay panel.

It is against this background that the polarization conversion and color-combination techniques for pico projector illuminators have been developed.

DETAILED DESCRIPTION

Figure 1:
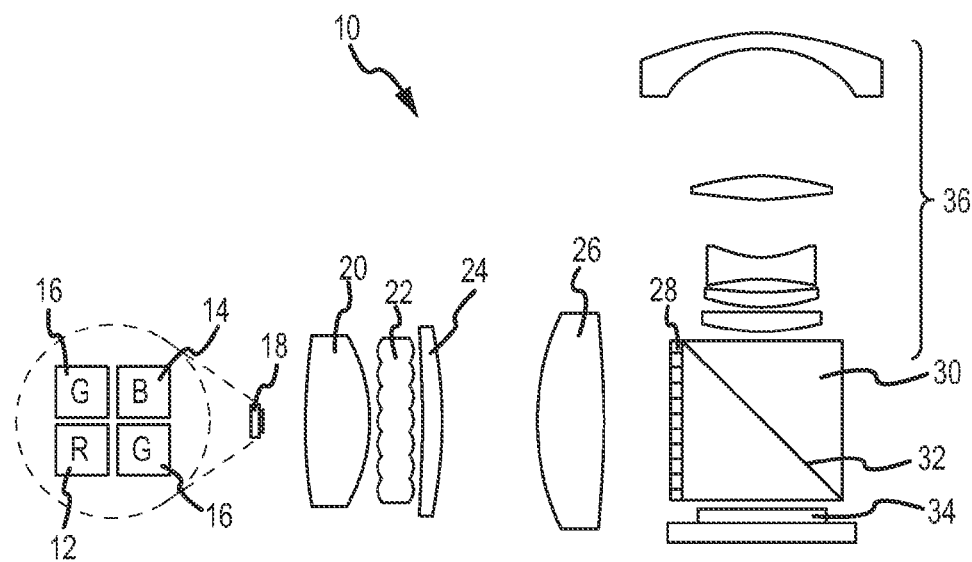
FIG. 1 is a first prior art pico projector.

While the embodiments of the present invention are susceptible to various modifications and alternative forms, specific embodiments thereof have been shown by way of example in the drawings and are herein described in detail. It should be understood, however, that it is not intended to limit the invention to the particular form disclosed, but rather, the invention is to cover all modifications, equivalents, and alternatives of embodiments of the invention as defined by the claims.

FIG. 1 illustrates by example an overall optical architecture with the system elements for a prior art pico projector 10. Four LED die, one red 12, one blue 14, and two green 16, are mounted on a single substrate, in a 2×2 array for example, as an LED light source 18. A condenser lens 20 collects the light they emit, collimates it, and directs it towards a fly's eye double microlens array 22. The fly's eye array 22 is a conventional one that transforms a non-uniform irradiance distribution to a more uniform irradiance distribution. After passing the fly's eye array 22, a pair of lenses (a positive meniscus lens 24 and a biconvex lens 26, in this example) further shapes the light beam, and passes it towards a pre-polarizer 28. The now-polarized beam enters a polarizing beam splitter (PBS) 30, the beam-splitting hypotenuse face 32 of which reflects the beam onto an LCOS microdisplay 34. After the pixels of the microdisplay 34 modulate the beam with electronic image information the beam reflected by the microdisplay 34 is transmitted through the PBS 30, and formed into an image on a projection screen (not shown) by the projection lens 36. The drawing of FIG. 1 is not necessarily to scale, and is only intended to indicate the various elements composing an exemplary pico projector optical system 10.

Figure 2:
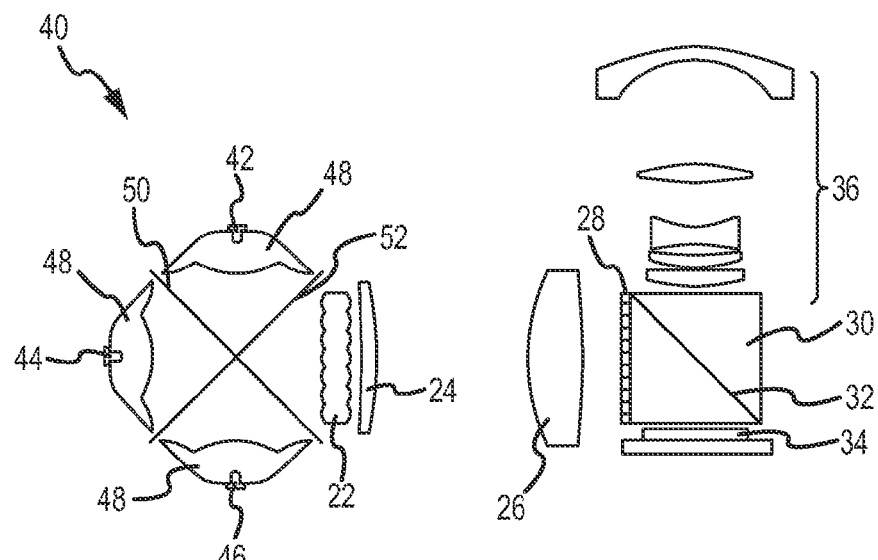
FIG. 2 is a second prior art pico projector.

FIG. 2 illustrates by a second example another optical system architecture for a pico projector 40. Similar components will use the same reference numbers as in FIG. 1. In this case, red, green, and blue LEDs 42, 44, and 46 are separated. For each LED, a dedicated combination refractive/reflective optic 48 collects the emitted light, generating three separate light beams, one of each color. A pair of dichroic combiner plates 50 and 52 combines the three beams into a single beam directed towards the fly's eye array 22. The dichroic plates 50 and 52 may be made, as is known in the art, of glass coated with a stack of dielectric films. The coating stacks are designed, in this case, so that each plate transmits green light. By action of its coating stack one plate 50 also transmits blue light but reflects red light, while the other 52 also transmits red light but reflects blue light.

In the case of both the system architecture illustrated in FIG. 1 and the system architecture illustrated in FIG. 2, the fly's eye array 22 and the following lens pair 24 and 26 serve to create a beam of homogeneous color and intensity on the microdisplay 34, even though the beam entering the fly's eye array 22 may have neither of those properties. Furthermore, by appropriate design the fly's eye array 22 and following lens pair 24 and 26 can transform the beam cross section to a rectangular one matching the shape and size of the active area of the microdisplay 34, even though the incident beam might be round, or some other shape, and might be a different size than the size of the microdisplay 34. Design techniques for accomplishing these objectives are well known in the art, as described, for example, by Peter Schreiber et al. in their paper "Homogeneous LED-illumination using microlens arrays," published in *Nonimaging Optics and Efficient Illumination Systems II*, edited by R. Winston and R. J. Koshel (SPIE, Bellingham, Wash., 2005), Proceedings of SPIE, vol. 5942, pages 59420K1-9.

Both the systems 10 and 40 of FIG. 1 and of FIG. 2 suffer a significant efficiency loss due to unpolarized light emitted by the LEDs being only partly transmitted by the pre-polarizer 28 at the entrance to the PBS 30. The system of FIG. 2 is also enlarged by the volume needed to accommodate the dichroic color combining apparatus 50 and 52.

So-called "polarization conversion systems" (PCS) can be used to overcome efficiency losses that would otherwise arise from the use of unpolarized light sources in systems requiring polarized illumination. Several such PCS implementations are described by F. E. Doany et al. in their article "Projection display throughput: efficiency of optical transmission and light-source collection," published in the IBM Journal of Research and Development, vol. 42, pp. 387-399 (1998). However, all such polarization conversion systems double the étendue or "extent" of the light source, necessitating faster, larger, and more complex implementations of other optical system elements such as of the PBS and projection lens, separately or in combination with the microdisplay.

Figure 3:
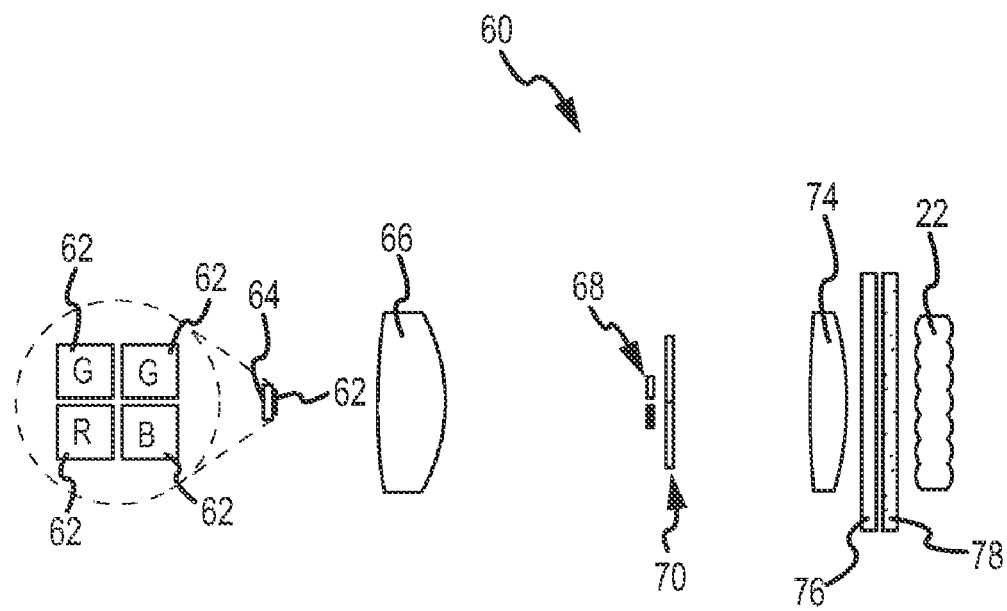
FIG. 3 is a first illuminator for a pico projector.
Figure 8:
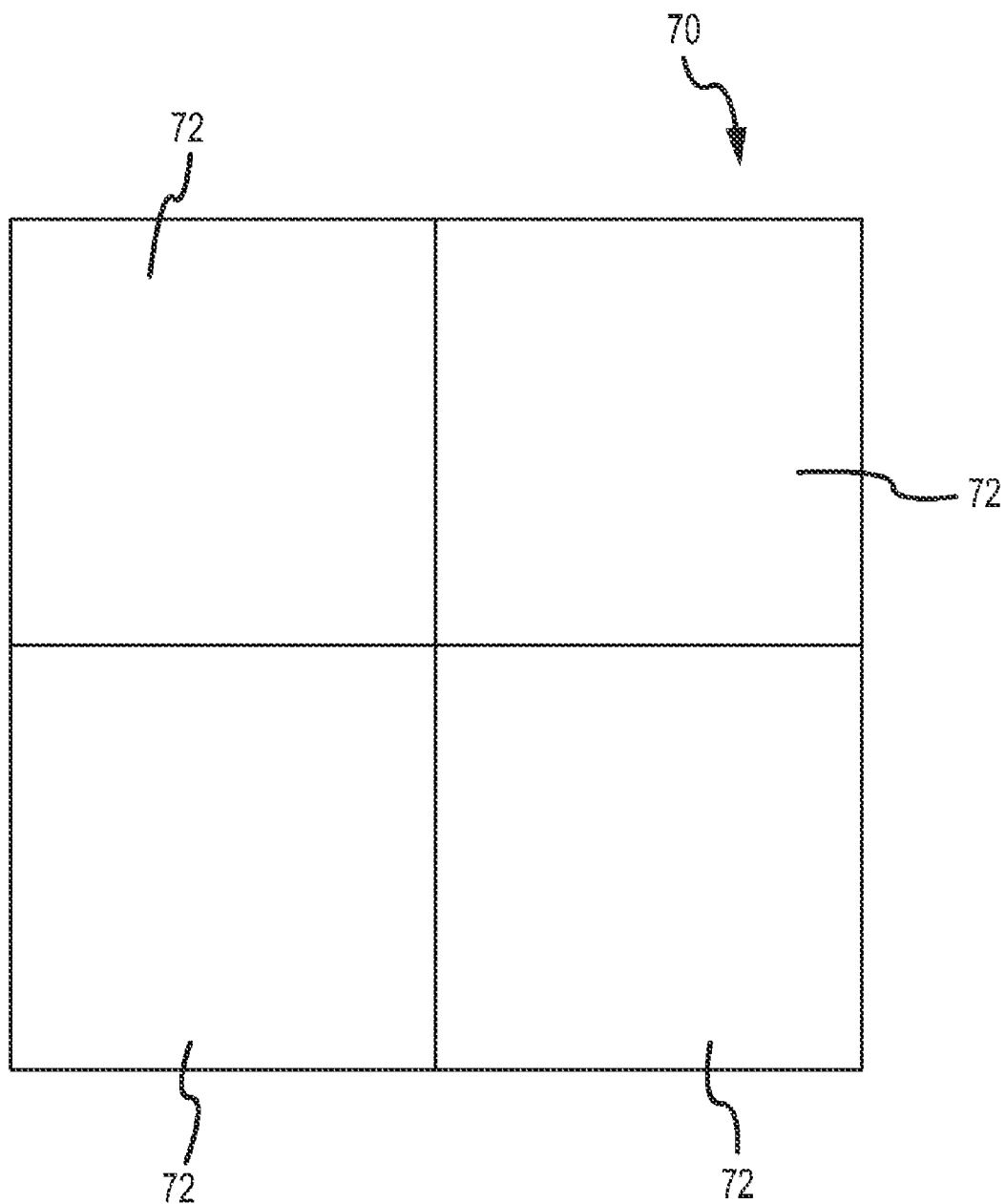
FIG. 8 is a front view of a dichroic mirror of the systems of FIG. 3.

However, when the light source is a multi-color source with the different colors not completely superimposed, as in the architecture described with reference to FIG. 1, a PCS can be inserted without further increasing the system étendue, as we now describe with regard to the inventive embodiments depicted in FIGS. 3, 4, 5, and 6. FIG. 3 shows components of an illumination system 60 similar to that depicted in FIG. 1 in that it may utilize a fly's eye array 22 as a homogenizer, and in that it utilizes differently colored LED light sources 62 mounted on a common substrate 64. In this case, the array is formed so that the two green light sources are on the top row and the red and blue sources are on the bottom row. The light sources are mounted in substantially the same plane in a spaced-apart, adjacent relationship so that the primary axis of light emitted from each is substantially parallel to each other. A first lens 66 and its spacing to the light sources 62 are chosen so that it creates a magnified image (shown at 68) of the sources 62. A patterned dichroic filter 70 is placed in or close to the image plane. The dichroic filter 70 is made with regions 72 (shown in FIG. 8) that correspond to the images of the differently-colored light sources 62, wherein the different regions 72 have different color-selective reflection properties, chosen so that the light forming the image of the green light source passes through a region of the filter 70 that transmits green light and that reflects red and blue light. The light forming the image of the red source passes through a region of the filter 70 that transmits red light and reflects at least green light. The light forming the image of the blue source passes through a region 72 of the filter 70 that transmits blue light and reflects at least green light. Such color-selective regions 72 can be made with dielectric coatings on a glass plate. The complete filter 70 could be made, for example, by cutting differently coated glass sheets into pieces and assembling the pieces side by side. Alternately, the filter 70 could be made by patterning different coatings on a single glass sheet, using techniques like those practiced for example by Ocean Optics in their making of color wheels for scrolling color-sequential projectors. After passing through the patterned dichroic filter 70, the light is collimated by a second lens 74. The emerging collimated light passes through a polarization conversion component such as, for example, a quarter-wave retarder plate 76 and then encounters a reflective polarizer 78. The polarizer 78 is chosen to transmit a first polarization and reflect a second, orthogonal, polarization. Examples of such polarizers include wire-grid polarizers like those sold by Moxtek (Orem, Utah), double brightness enhancing films (DBEF) or multilayer optical-film (MOF) polarizers made by 3M (St. Paul, Minn.), and cholesteric polarizers such as described by Y. Huang et al. in their paper "Broadband circular polarizer using stacked chiral polymer films," published in Optics Express, vol. 15, pp. 6414-6419 (2007). The light of the first, transmitted polarization then proceeds to the rest of the projector optical system which may otherwise be of the nature of systems 10 or 40, where it might first encounter a fly's eye array 22 as depicted here.

The light of the second, reflected, polarization proceeds back, passing again through the quarter-wave plate 76 and lens 74, which images it back on top of the magnified source image 68. However, by virtue of having been reflected off the polarizer 78, the image of the light sources formed by the reflected light is mirror-reversed (along a diagonal) relative to the original image 68. Hence all the reflected light from the polarizer 78 lands on regions 72 of the patterned dichroic filter 70 which are reflective to the color pattern of the reflected, mirrored image. Thus, this light reflects off the dichroic filter 70, is again collimated by lens 74, passes again through the quarter-wave plate 76 and again encounters the reflective polarizer 78. Since the light has passed twice through the quarter-wave plate 76 since first reflecting off the polarizer 78 its polarization has now been flipped to have the first polarization, and it is now transmitted by the polarizer 78 to exit the illuminator through the fly's eye array 22. In this way the beam of light, that if focused to image the sources would have formed red, green, and blue spots, has been transformed, so that if focused to image the sources it now would form a pattern of yellow (combination of green and red) and cyan (combination of green and blue) spots. Further, all the initially unpolarized light from the sources 62 is now present in the fully polarized beam. The only losses occur because of non-ideality in the design and manufacture of the reflective polarizer 78, the quarter-wave plate 76, and the dichroic filter 70. This has been accomplished without increasing the étendue or extent of the beam beyond that of the case depicted in FIG. 1. In the embodiment described with reference to FIG. 3, the differently colored light sources are arranged so that when comparing the light source positions with the mirror-image light source positions, the same color source is not found in the same position in both.

In the embodiment described above with reference to FIG. 3, the intermediate, magnified image 68 of the light source was produced in order to reduce the range of angles that would otherwise be present if the dichroic filter 70 were placed directly over the sources, enabling high desired dichroic-filter performance levels (high transmission in their pass band and high reflectivity out of their pass band) to be more easily attained. By appropriate choice of focal length for lens 74 the range of ray angles entering the fly's eye array 22 can be made to be the same as in the system 10 in FIG. 1 without polarization recovery. For example, if lens 66 magnifies the source by a factor of two, then if lens 74 has twice the focal length of the condenser lens 20 in system 10 in FIG. 1, the angle range on the fly's eye array 22 will be the same. Other, either greater or lesser, magnification ratios can be chosen within the embodiments of the invention. Smaller magnification ratios lead to smaller overall system sizes but bigger ranges of angles on the dichroic filter 70. To minimize illumination system size, in some embodiments, it may be preferable to use the minimum magnification consistent with adequate achievable dichroic filter performance.

As can be appreciated, the system 60 of FIG. 3 offers several advantages over the systems 10 and 40 of FIGS. 1 and 2. First of all, a much greater percentage of the light output by the light sources is used to illuminate the display, since the polarization of the light reflected by the reflective polarizer 78 is converted and then passed through the polarizer 78. This does not occur in the prior art systems 10 and 40. Second, by magnifying the image of the light sources, the angles of light passing through the downstream optical components 70, 74, 76, 78, and 22 can be reduced. In addition, by combining the colors with the use of the reflection of a significant portion of the light off the polarizer 78 and dichroic filter 70, instead of using the dichroic color combining apparatus 50 and 52, the volume of the system 60 can be reduced. Further, the system 60 does not increase the étendue of the light source.

Figure 4:
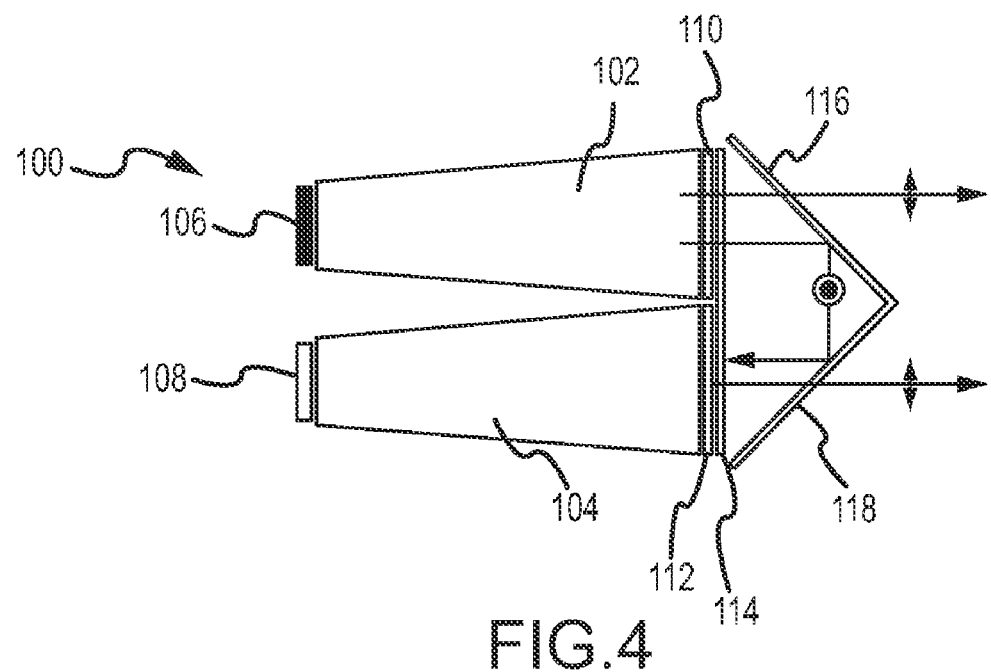
FIG. 4 is a second illuminator for a pico projector.

Another embodiment of a color-selective polarization recovery illuminator is depicted in the system 100 of FIG. 4. Here, substantially parallel, tapered light pipes 102 and 104 collect the light emitted by spaced-apart LEDs 106 and 108 that emit light along substantially parallel axes. The collected light is confined within the pipes 102 and 104, which might be made of glass or clear plastic (or other suitable optically transmissive material), by total internal reflection, until it reaches the exit face (the face opposite the LED). Alternately, the pipes 102 and 104 could be hollow, with their interior walls made highly reflecting. The tapered light pipes 102 and 104 have a narrower cross-section at an end near the light sources 106 and 108 than at an end near the exit faces. The taper of the pipe 102 and 104 serves, like the magnification in the embodiment described with reference to FIG. 3, to expand the cross section of the beam of light collected from the light source 106 and 108, and to thereby reduce its angular divergence. Different pipes 102 and 104 serve light sources 106 and 108 of different colors. For example, the first pipe 102 might collect light from one or more green LEDs 106 while the second pipe 104 collects light from a combination of blue and red LEDS 108. After the light is emitted from the exit face of one of the respective pipes 102 and 104 it passes through one of a respective color-selective reflector or dichroic mirror 110 and 112 (no distinction is intended here between the terms dichroic mirror and dichroic filter, as they each relate to a device that transmits light of certain wavelengths and reflects light of other wavelengths). These elements 110 and 112 are chosen to have the property of transmitting light of the color emitted by their respective light pipes 102 and 104. For example, if the first light pipe 102 collected light from one or more LEDs 106 emitting green light, then its dichroic mirror 110 would be designed to transmit green light and reflect other colors, and so on. The dichroic mirrors 110 and 112 could be supplied on a single substrate made by the patterning technique referred to above, or could be provided as separate pieces. Alternately, the dichroic-mirror coatings could be applied directly to the ends of the light pipes 102 and 104.

After passing through the dichroic mirrors 110 and 112, the light emitted from the exit faces of the light pipes passes through a quarter-wave plate 114, and then encounters one of a pair of respective reflective polarizers 116 and 118 or polarizing beam splitter. The reflective polarizers 116 and 118 can be made from wire-grid, multilayer polymer films, or cholesteric liquid-crystal polymer films as described before, and are positioned substantially orthogonally to each other. Alternately, since the reflective polarizer film is in this case angled at approximately 45° to the axis of the emitted beam, the reflective polarizers 116 and 118 could be made as a conventional MacNeille polarizing beam splitter (PBS) cube prism (this interchangeability is generally true for other embodiments disclosed herein). Generically the reflective polarizers, PBSs, and other suitable arrangements can be referred to as a reflective polarizer assembly. In any case, the reflective polarizers 116 and 118 transmits a first polarization (to exit the illuminator) and reflects a second polarization. The reflective polarizers 116 and 118 are arranged so that the reflected polarization of a given beam is directed towards the other reflective polarizer where it is reflected again, and directed back through the quarter-wave plate 114 to the other dichroic mirror 110 or 112. There, the light is reflected (because it is of a different color than the light transmitted through that dichroic mirror), to pass again through the quarter-wave plate 114. The two passes through the quarter-wave plate 114 flip the polarization from the second polarization to the first polarization, so that as the light approaches the reflective polarizers 116 and 118 again, it now has the first polarization and is transmitted through the respective polarizer to exit the illuminator.

In one exemplary embodiment of this form of the invention, the first light source comprises green LEDs 106, while the second light source comprises blue LEDs and red LEDs 108. Thus, the light emitted by the exit face of the first pipe 102 has the first color green, while the light emitted at the exit face of the second light pipe 104 has the second color magenta. The reflective polarizers, quarter-wave plates, and dichroic mirrors of systems 60 and 100 act to superimpose beams of the first color and of the second color. Thus, in this example, the final form of the overall light beam leaving the polarization-converting apparatus could be white (green+magenta=white).

The degree to which the size of the exit faces of the light pipes are greater than the size of the entrance faces largely controls the degree of reduction in angular divergence of the light beams, and can be chosen in accordance with the performance limitations of the dichroic mirrors, as described above.

Figure 5:
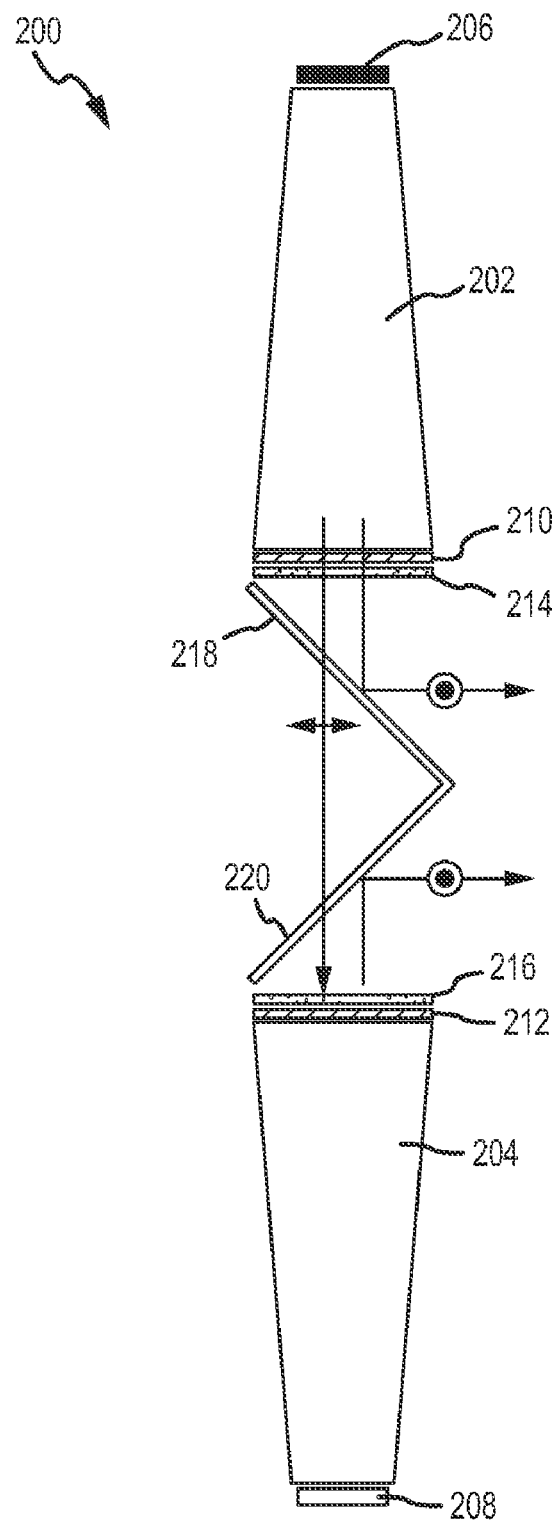
FIG. 5 is a third illuminator for a pico projector.

An alternative embodiment to the color-selective polarization recovery illuminator depicted in FIG. 4 is shown in a system 200 shown in FIG. 5, which differs primarily in form-factor from that illustrated in FIG. 4. The system 200 of FIG. 5 incorporates similar elements to those of the embodiment of FIG. 4, including tapered light pipes 202 and 204 to collect the light emitted by LEDs 206 and 208, color-selective dichroic mirrors 210 and 212 positioned at the output of the light pipes 202 and 204, quarter-wave plates 214 and 216 positioned adjacent to the color-selective dichroic mirrors 210 and 212, and reflective polarizers 218 and 220, all with properties similar to those of the configuration depicted in FIG. 4. The reflective polarizers 218 and 220 might alternatively be made as conventional MacNeille PBSs. However, the light pipes 202 and 204 of the system 200 shown in FIG. 5 are arranged such that their longitudinal axes are essentially in-line, with exit faces opposite to and facing each other. This is in contrast to the system 100 of FIG. 4 in which the light pipe exit faces are essentially parallel and adjacent to each other.

In application, the system 200 of FIG. 5 is similar to the system 100 of FIG. 4. In particular, following FIG. 5, light emitted by the exit faces of the light pipes 202 and 204 passes through the respective dichroic filters 210 and 212 and quarter-wave plates 214 and 216 to encounter the reflective polarizers 218 and 220 (or PBSs), as in the system 100 of FIG. 4. The reflective polarizers 218 and 220 each transmit a first polarization and reflect a second polarization (which exits the illuminator). However, in the system 200 of FIG. 5, the first polarization of light from one light pipe 202 (for example) is transmitted by both of the reflective polarizers 218 and 220, and it encounters the quarter-wave plate 216 and dichroic mirror 212 associated with the second light pipe 204. There, the light is reflected, to pass again through the quarter-wave plate 216 of the second light pipe 204. The two passes through the quarter-wave plate 216 flip the polarization, so that as the light approaches the reflective polarizer 220 again it now has the second polarization and is reflected and exits the illuminator. Light from the second pipe 204 experiences the reflective polarizers, quarter-wave plates, and dichroic mirrors in a similar manner to result in reflection of the second polarization off of relective polarizer 220 out of the illuminator and reflection of the second polarization off of relective polarizer 218 out of the illuminator. Of course, the light (that originated with LED 208 and light pipe 204 and which is) reflected off of reflective polarizer 218 has first been converted from the first polarization of light to the second polarization of light.

As in the system 100 of FIG. 4, the system 200 illustrated in FIG. 5 can provide a white beam. In particular, the first light source 206 may include green LEDs, while the second light source 208 may include blue LEDs and red LEDs. Thus, the light emitted by the exit face of the first light pipe 202 has the first color green, while the light emitted at the exit face of the second light pipe 204 has the second color magenta. The reflective polarizers 218 and 220, quarter-wave plates 214 and 216, and dichroic mirrors 210 and 212 act to superimpose beams of the first color and of the second color. Thus, in this example, the final form of the overall light beam leaving the polarization-converting apparatus could be white (green+magenta=white).

Figure 6:
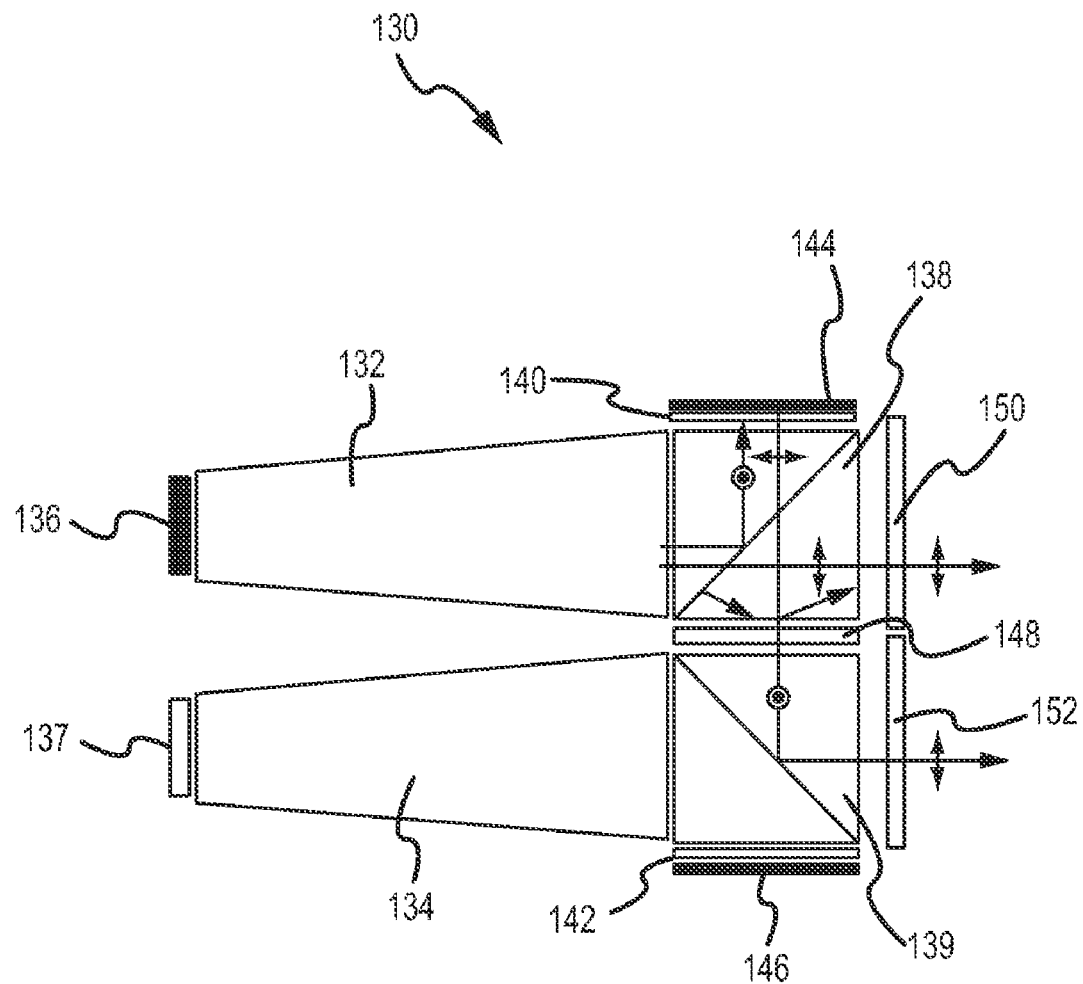
FIG. 6 is a fourth illuminator for a pico projector.

FIG. 6 shows yet another embodiment of a color-selective polarization conversion system 130. The tapered light pipes 132 and 134 collect light from various colored light sources 136 and 137 in a manner similar to that described above with respect to FIG. 4. In the embodiment of FIG. 6, though, there are no dichroic mirrors, and the reflective polarizers, are MacNeille-type PBSs 138 and 139, as shown here. Incorporating PBSs in this embodiment in effect extends the light pipes by trapping additional light rays within the PBSs as illustrated in FIG. 6 by total internal reflection. This is achieved when there is an air-gap between the two PBSs and the light pipe assemblies, as illustrated in the figure. In this embodiment the hypotenuse of each PBS is angled outward rather than inward as in the embodiment of FIG. 4. Of course, other reflective polarizer types, such as those included in the description of the FIG. 4 embodiment could also be used here. The un-polarized light emitted by the exit face of the light pipe first encounters the reflective polarizer or PBSs 138 and 139. In this example, light of p-polarization is transmitted, and light of s-polarization is reflected outwards. It next encounters one of a respective pair of quarter-wave plates 140 and 142 and mirrors 144 and 146, which flips its polarization to (p) and returns it inwards. It is now transmitted through the first PBS 138, and encounters a half-wave plate 148 between the first and second PBSs 138 and 139, which again flips its polarization, now back to (s), so that it is reflected by the second PBS 139 and emerges superimposed on and parallel to the transmitted light beam of the second color (not shown). The second-color light emitted by the second light pipe 134 is converted in a similar fashion, and emerges superimposed on and parallel the transmitted light beam of the first color. However, the converted beams emerge from the PBSs 138 and 139 oppositely polarized to the transmitted beams. Retarder-stack filters (RSF) 150 and 152 placed after the PBSs 138 and 139 rectify this situation. They are designed to not change the polarization of the transmitted color while flipping the polarization of the reflected color. In this manner, the light transmitted from the light source 137 through the PBS 139 is not affected by RSF 152, while the light which originally came from light source 136 and was reflected by PBS 139 has its polarization converted by RSF 152 to the same polarization as the previously-described light passing through the PBS 139 and RSF 152. Such RSFs 150 and 152 are commercially available from ColorLink (Boulder, Colo. and Tokyo, Japan) under the trademark ColorSelect. Again, making the first color green and the second color magenta (red plus blue) can enable the output beam to be white. An optically efficient pico projector can then be made by placing the output faces of the light pipes as close together as possible, which is achieved in this case by placing the PBSs as close together as possible, and imaging this plane onto the display with additional relay optics (not shown). An especially compact version of such an imaging system can be implemented by placing a quarter-wave plate and reflector on one face of a PBS, as described in the article by Mark Handschy entitled "Moves toward mobile projectors raise issue of panel choice," published in Display Devices Fall '07 (Dempa, Tokyo), pp. 6-8 (2007), incorporated herein by reference.

As can be appreciated the systems 100, 200, and 130 also offer several advantages as compared to systems 10 and 40. First of all, a much greater percentage of the light output by the light sources is used to illuminate the display, since the polarization of the light reflected by the reflective polarizer 78 is converted and then passed through the polarizer 78. This does not occur in the prior art systems 10 and 40. In addition, by combining the colors with the use of the reflection of a significant portion of the light off the reflective polarizers and dichroic filter, instead of using the dichroic color combining apparatus 50 and 52, the volume of the system 60 can be reduced. Lastly, the systems 100, 200, and 130 do not increase the étendue of the light source.

Figure 7:
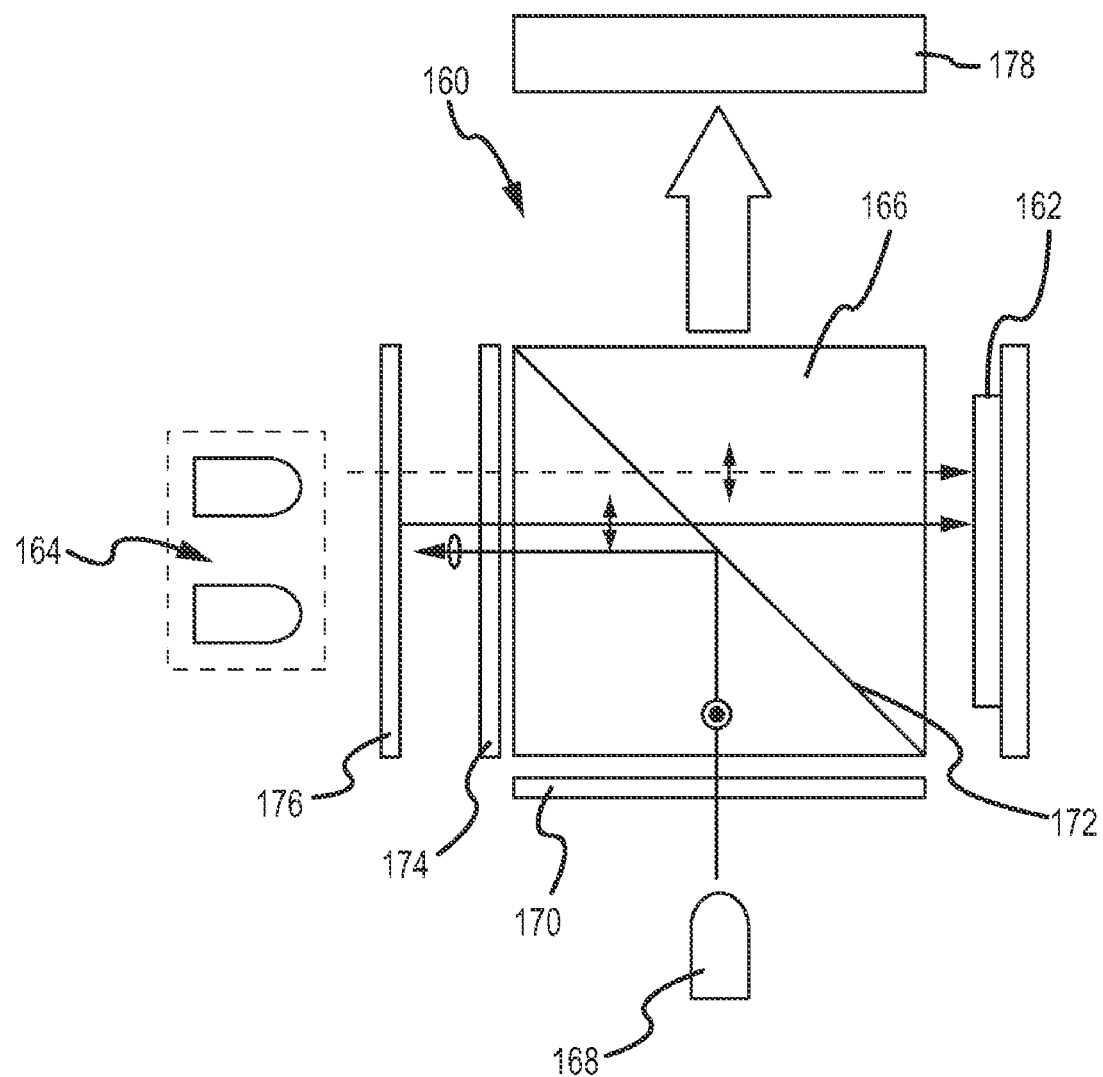
FIG. 7 is a portion of a pico projector, showing a color-combining system.

FIG. 7 shows an optical system 160 for combining light of different colors into a single beam illuminating a reflective display 162. Unlike the system 40 depicted in FIG. 2, this system 160 does not require separate angled color-combining plates, and hence may offer more-compact implementations. A first-color light source 164, with beam forming, polarization, and homogenization elements not shown, illuminates the reflective display 162, which could be an LCOS microdisplay, by transmitting p-polarized light through polarizing beam splitter (PBS) 166. A second-color light source 168, also with forming, polarization, and homogenization elements not shown, directs s-polarized light into an adjacent face of the PBS 166. To ensure that none of its light is transmitted through the PBS 166, a high-contrast pre-polarizer 170 is provided. The second-color light is reflected at the PBS hypotenuse 172, and directed towards the first-color light source 164, but first encounters a quarter-wave plate 174 and dichroic mirror 176. The dichroic mirror 176 is designed to transmit light of the first color, but to reflect light of the second color. Thus, the second-color light is reflected, and having traversed the quarter-wave plate 174 twice has its polarization flipped so that it is now transmitted through the PBS 166 to illuminate the display 162. In this way the color-combining dichroic mirror 176 is made normal to the beam axis, and space is saved. After being selectively reflected by the display 162, the light (from each of the light sources) is reflected by the hypotenuse face 172 toward and through projection optics 178.

As can be appreciated, disclosed herein are illumination systems especially suitable for very small data projectors, called pico projectors. The disclosed illumination systems provide high optical efficiency for projectors that need polarized light but utilize unpolarized light sources such as light-emitting diodes. Some of the disclosed illumination systems make use of light sources of different colors, and provide polarization conversion in ways based on color-selective elements of a variety of different types to convert substantially all the light emitted by the light sources to a single polarization, without increasing the effective optical extent of the source. Other disclosed illumination systems provide compact ways to combine light from differently colored light sources without the use of bulky x-cube or angled dichroic elements. As can be appreciated, in some of the embodiments it may be possible to replace light pipes with other types of light guides including lenses and it may be possible to replace PBSs with reflective polarizers.

While the embodiments of the invention have been illustrated and described in detail in the drawings and foregoing description, such illustration and description is to be considered as examples and not restrictive in character. For example, certain embodiments described hereinabove may be combinable with other described embodiments and/or arranged in other ways (e.g., process elements may be performed in other sequences). Accordingly, it should be understood that only example embodiments and variants thereof have been shown and described.

What is claimed:

1. An apparatus for illuminating a display, comprising:
a first and a second light source, spaced apart from each other, that emit light of a first and a second color, respectively, in the general direction of a primary axis associated with each light source, the primary axes of the two light sources being substantially parallel to each other;
a first and a second light pipe that are oriented with primary axes generally parallel to each other, and that receive light from a respective one of the first and second light source and emit light from a light-emitting face at an end of the respective light pipe opposite from the respective light source;

a reflective polarizer assembly having a first pair of faces located at substantially orthogonal angles to each other and a pair of opposing faces, with each of the opposing faces being on an opposite side from a respective one of the orthogonal faces, the reflective polarizer assembly allowing light of a first polarization to pass therethrough and reflecting light of a second polarization that is orthogonal to the first polarization;

a first polarization conversion component receptive of light from the reflective polarizer assembly that converts light between the first and second polarizations after two passes therethrough;

a first mirror that reflects light from the first polarization conversion component back through the first polarization conversion component toward the assembly;

a second polarization conversion component receptive of light from the reflective polarizer assembly that converts light between the first and second polarizations after two passes therethrough;

a second mirror that reflects light from the second polarization conversion component back through the second polarization conversion component toward the assembly;

wherein the light of one of the first and second polarizations is converted to the other of the first and second polarizations and allowed to exit the illuminator.

2. An apparatus as defined in claim 1, wherein the first and second mirrors are dichroic mirrors.

3. An apparatus as defined in claim 1, wherein the first and second mirrors are not dichroic mirrors.

4. An apparatus as defined in claim 1, wherein the primary axis of the first light pipe and the primary axis of the second light pipe are co-linear.

5. An apparatus as defined in claim 1, wherein the primary axis of the first light pipe and the primary axis of the second light pipe are spaced apart from each other by a distance substantially equal to the distance that the first and second light sources are spaced apart from each other.

6. An apparatus as defined in claim 1, wherein the first and second light pipes are hollow.

7. An apparatus as defined in claim 1, wherein the first and second light pipes are not hollow.

8. An apparatus as defined in claim 1, wherein the first and second light pipes are tapered so as to have a narrower cross-section nearer the respective light source than nearer the reflective polarizer assembly.

9. An apparatus as defined in claim 1, wherein the reflective polarizer assembly further includes a third polarization conversion component that converts light between the first and second polarizations after one pass therethrough.

10. An apparatus as defined in claim 1, wherein the reflective polarizer assembly further includes a retarder stack that passes light of one of the first and second colors without changing the polarization and converts the polarization of light of the other of the first and second colors.

11. An apparatus as defined in claim 1, wherein the reflective polarizer assembly includes a pair of PBSs.

12. An apparatus as defined in claim 1, wherein the reflective polarizer assembly includes a pair of planar reflective polarizers that are orthogonal to each other.

13. An apparatus as defined in claim 1, wherein the first and second polarization conversion components are quarter-wave plates.

14. An apparatus as defined in claim 9, wherein the third polarization conversion component is a half-wave plate.

* * * * *